United States Patent [19]

Grimm et al.

[11] 3,942,853

[45] Mar. 9, 1976

[54] GASKET ASSEMBLY OF A HOUSEHOLD REFRIGERATOR

[75] Inventors: Bernard J. Grimm; Stephen G. Boughton, both of Louisville, Ky.

[73] Assignee: General Electric Company, Louisville, Ky.

[22] Filed: Jan. 27, 1975

[21] Appl. No.: 544,067

[52] U.S. Cl. .............................. 312/296; 312/214
[51] Int. Cl.² ........................................ F25D 11/02
[58] Field of Search .......... 312/214, 296, 313, 351; 49/366

[56] References Cited
UNITED STATES PATENTS

| | | | |
|---|---|---|---|
| 3,077,644 | 2/1963 | Kesling | 312/296 X |
| 3,248,159 | 4/1966 | Hall | 312/296 |
| 3,408,772 | 11/1968 | Frehse | 49/366 |
| 3,726,578 | 4/1973 | Armstrong | 312/214 |

*Primary Examiner*—Casmir A. Nunberg

[57] ABSTRACT

A gasket assembly for side-by-side doors of a household refrigerator-freezer has first and second cooperating gasket elements. Each gasket element is connected to a respective door of the refrigerator-freezer. Each gasket element has a magnet in a magnet chamber for sealing the doors one to the other and a longitudinally extending insulating chamber for contacting the refrigerator mullion and forming a seal between the respective door and the mullion, as is known in the art.

The improved construction of this invention has a pair of elongated flanges, each connected to a respective insulating chamber. The flanges each extend from their respective gasket element toward the other gasket element in the closed position of the doors. Where a mullion is present, the flanges are each urged into contact with the mullion by their associated magnet for forming an improved seal. In the absence of a mullion, the flanges contact one another for sealing one gasket element to the other. The gasket elements each have a second longitudinally extending insulating chamber contacting the inner surface of the respective door for forming an improved, insulated seal.

6 Claims, 3 Drawing Figures

GASKET ASSEMBLY OF A HOUSEHOLD REFRIGERATOR

BACKGROUND OF THE INVENTION

For a number of years, side-by-side refrigerator-freezers have had a vertically extending partition dividing the cabinet into a full-height freezer compartment and a full-height fresh food compartment. The limited widths or horizontal dimensions of the compartments are a disadvantage in side-by-side refrigerator-freezers that are small enough to fit in the usual refrigerator nooks or spaces available in most kitchens. Regardless of the horizontal positioning of the vertical partition, the widths of the two compartments may be insufficient to store large frozen items such as frozen turkeys or relatively wide items such as food platters or trays. This is particularly a source of irritation for users accustomed to the full-width storage areas of refrigerators in which the freezer and fresh food compartments are one above the other.

This problem was solved in U.S. Pat. No. 3,726,578-Armstrong by providing the partition with a movable partition portion and a unique magnetic gasket assembly for sealing the refrigerator-freezer.

Although the system of U.S. Pat. No. 3,726,578-Armstrong, which is hereby incorporated by reference, functioned satisfactorily, it was decided that the sealing and insulating properties of the gasket assembly could be improved.

The improvement is directed toward the insulating properties adjacent the inner surface of the door and the sealing and insulating properties in the area of the magnets.

It was discovered that if a second longitudinally extending chamber was added to each gasket element and maintained in contact with the inner surface of the associated door, the sealing and insulating properties of the gasket would be improved.

It was further discovered that if a flange was connected to each first longitudinally extending chamber and extended outwardly toward the other flange element and behind the respective magnet element, the sealing and insulating properties of the gasket assembly in the area of the magnets would be improved. In a gasket area where a mullion is present, the magnets are attracted to the mullion and urge the intervening associated flanges into sealing contact with the mullion. In a gasket area where there is no mullion present, as in the Armstrong patent, the flanges are not urged inwardly by the magnets. These flanges, when not urged inwardly by the magnets, sealably contact one another and form a sealed barrier and an insulating dead air space between the flanges and the magnets.

SUMMARY OF THE INVENTION

In accordance with this invention, an improved gasket assembly is provided for adjacent doors of a household refrigerator-freezer. The gasket assembly has first and second gasket elements each associated with a respective door. Each gasket element has a longitudinally extending insulating chamber, a magnet chamber, a magnet positioned in the magnet chamber, means for connecting the magnet chamber to the insulating chamber, and means for connecting the gasket element to its respective door. The magnets are opposed one to the other and the magnet chamber connecting means is of a length sufficient for contact of the magnet chambers one with the other in the installed position on closed doors. A pair of second longitudinally extending insulating chambers, each having first and second sides, are each connected along the first side to an insulating chamber of a respective gasket element. In the installed position on a respective door, the second side of each second insulating chamber is in contact with an inner surface of the door. A pair of elongated flanges are each connected to a respective insulating chamber. Each flange extends outwardly from its respective insulating chamber. The flanges are of a length sufficient for extending behind their respective magnet chamber and contacting one another in the installed position on closed doors.

DETAILED DESCRIPTION OF THE INVENTION

Figure 1:
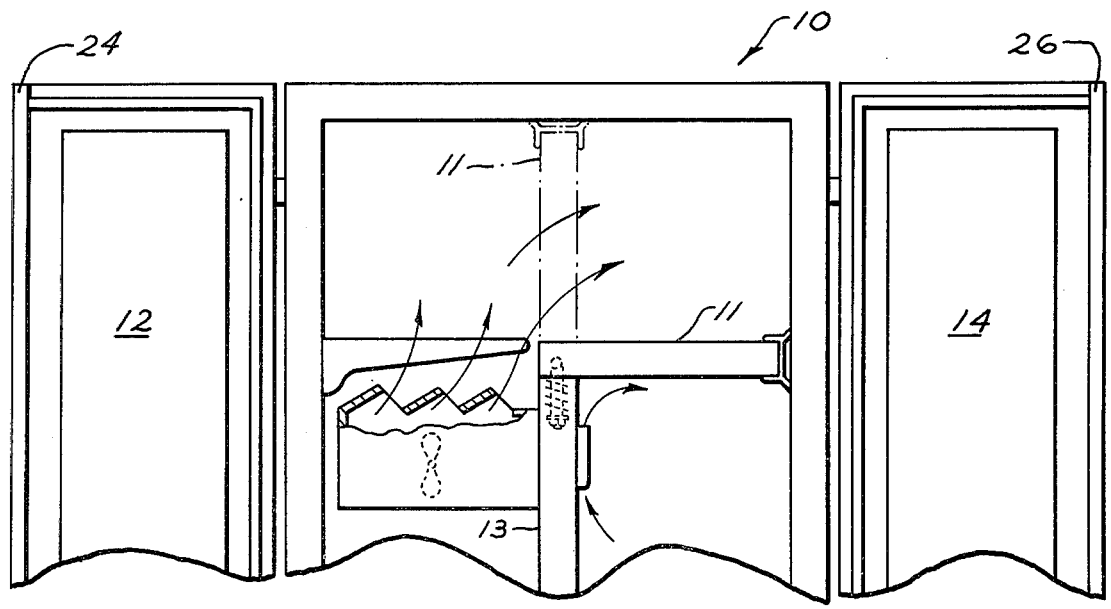
FIG. 1 is a diagrammatic partial frontal view of a refrigerator on which the gasket of this invention can be used.

In the embodiment of FIG. 1, a household refrigerator-freezer 10 has a pivotally movable mullion section 11 and a stationary mullion section 13, as shown in U.S. Pat. No. 3,726,578-Armstrong. The pivotally movable mullion section 11 is movable between a horizontal position shown in solid lines and a vertical position shown in broken lines. When the refrigerator doors 12, 14 are closed, the opposed door edges lie along the vertical plane of the stationary mullion section 13, as is known in the art.

Figure 2:
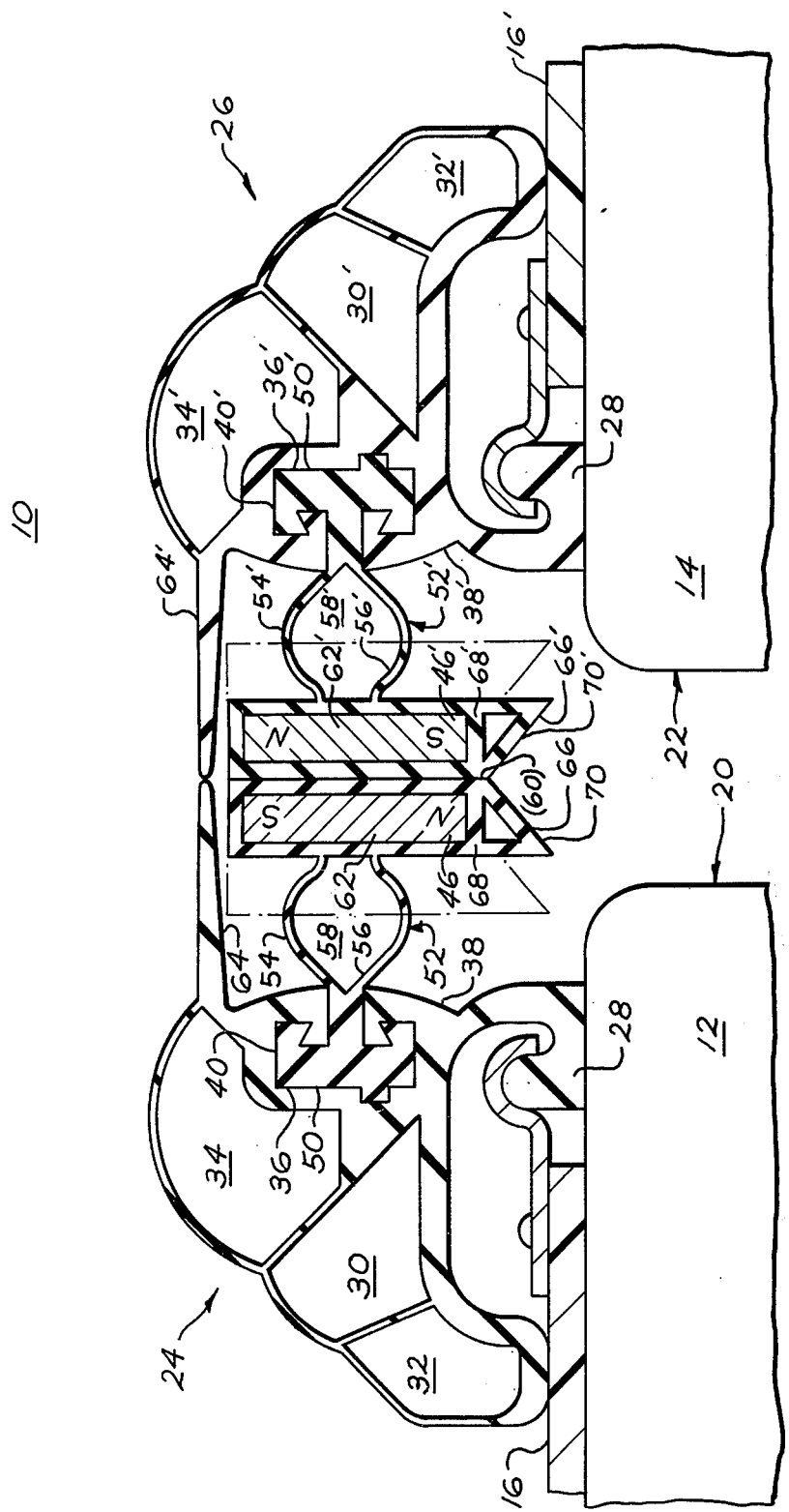
FIG. 2 is a diagrammatic view in partial section of a portion of the first and second adjacent doors of a mullion-free portion of a household refrigerator having the gasket assembly of this invention.

In the embodiment of FIG. 2, the first and second doors 12, 14 each have an inner surface 16, 16' and a longitudinally extending first edge portion 20, 22. The adjacent first edge portions 20, 22 are generally vertically oriented.

First and second gasket elements 24, 26 each have means such as a hook 28, 28' for connecting each gasket element 24, 26 along a respective door first edge portion 20, 22. The gasket elements 24, 26 each have a plurality of longitudinally extending insulating chambers 30, 30', 32, 32', 34, 34', a flange element 64, 64' extending outwardly from a respective insulating chamber 34, 34', and a longitudinally extending holding chamber 36, 36' that is open along an outer side 38, 38'.

Each holding chamber 36, 36' has a transverse portion 40, 40' and is preferably of a general "T" configuration. Each longitudinally extending insulating chamber 32, 32' has a first side connected to an adjacent insulating chamber 30, 30' and a second side in contact with the associated inner surface 16, 16' of the respective door 12, 14 in the installed position thereon.

A pair of longitudinally extending magnet chambers 46, 46' are each connected to a respective insulating chamber 34, 34' by a longitudinally extending connecting element 52, 52'. A longitudinally extending holding element 50, 50' is formed along one end of each connecting element 52, 52'. Each holding element 50, 50' is of a construction for mating with and insertion into a respective holding chamber 36, 36'. Each longitudinally extending connecting element 52, 52' preferably has first and second longitudinally extending walls 54, 56 and 54', 56' for forming a longitudinally extending insulating chamber 58, 58'.

In the improved gasket of this invention, the chambers 30, 30', 32, 32', 34, 34', 36, 36', 46 and 46', flange elements 64, 64', holding elements 50, 50', and connecting elements 52, 52' each extend continuously along substantially the entire length of their respective gasket element 24, 26. However, these elements can be interrupted without departing from this invention so long as the interruption does not substantially reduce the sealing and insulating properties of the gasket assembly.

As shown in FIG. 2, the flange elements 64, 64' and the connecting elements 52, 52' are of dimensions sufficient for contact of the adjacent magnet chamber walls and the associated flange elements 64, 64' in the installed position on closed doors 12, 14.

A magnet 62, 62' is positioned within each of the magnet chambers 46, 46'. The magnets 62, 62' are oriented relatively one to the other for attracting one another in the installed position on closed doors 12, 14. The magnets 62, 62' are preferably of a rectangular cross-sectional configuration and extend continuously through substantially the entire length of the respective magnet chamber 46, 46'.

In order to provide improved seating of the magnets during closing of the doors, a guiding chamber 66, 66' extends longitudinally along a respective magnet chamber first edge 68, 68'. Adjacent walls 70, 70' of the guiding chambers 66, 66' are angularly disposed relative one to the other.

In the operation of the assembly, the space between adjacent closed doors 12, 14 is sealed by the attraction of the opposed magnets 62, 62' moving the magnet chamber walls 60, 60' into sealing contact one with the other.

Figure 3:
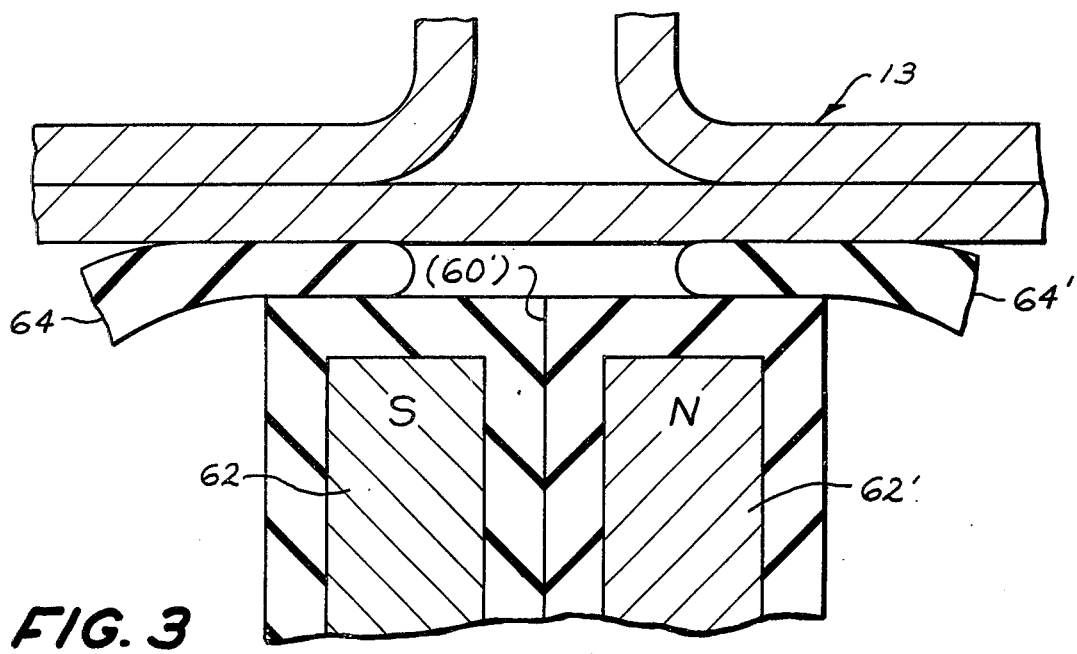
FIG. 3 is a diagrammatic view in partial section of a portion of the gasket assembly of this invention sealing against a mullion.

Referring to FIG. 3, where the magnets are adjacent a portion of the mullion 13, the magnets 62, 62' are attracted toward the mullion face and urge the intervening flanges 64, 64' into sealing engagement with the mullion 13. Where the magnets 62, 62' are not adjacent a mullion, for example that gasket area above mullion 13 when mullion 11 is extended horizontally (FIG. 1), the flanges 64, 64' form a seal by contacting one with the other, as shown in FIG. 2.

By this construction, a double seal is formed by the cooperating flanges 64, 64' and the cooperating magnet chambers 46, 46', and a dead air insulating space is defined thereby. Further insulation is provided by the insulating chambers 32, 32' each extending into contact with the respective door inner surface 16, 16' along substantially the entire length of the gasket element.

Other modifications and alterations of this invention will become apparent to those skilled in the art from the foregoing discussion, and it should be understood that this invention is not to be unduly limited thereto.

What is claimed is:

1. In an improved gasket assembly for adjacent doors of a household refrigerator-freezer, said gasket assembly having first and second gasket elements each associated with a respective door, each gasket element having a longitudinally extending insulating chamber, a magnet chamber, a magnet positioned in the magnet chamber, means connecting each magnet chamber to its respective insulating chamber, and means connecting each gasket element to its respective door, said magnets being opposed one to the other and each of said magnet chamber connecting means being of a length sufficient for contacting the magnet chambers one with the other in the installed position on closed doors, the improvement comprising:

a pair of second longitudinally extending insulating chambers each having first and second sides and being connected along the first side to the insulating chamber of a respective gasket element with the second side being in contact with an inner surface of the respective door in the installed position on the door, said insulating chambers extending across an inner side of their respective magnet chamber for separating the magnet chambers from the refrigerator food compartments; and a pair of flanges each connected to a respective insulating chamber and extending outwardly therefrom, said flanges each being of a length sufficient for extending behind their respective magnet chamber and contacting one another in the installed position on closed doors.

2. A gasket assembly, as set forth in claim 1, including a pair of holding chambers each connected to the insulating chamber of a respective gasket element, each of said holding chambers being of a general "T" configuration and open along an outer side, the magnet chamber connecting means each have a holding element of a configuration matable with the respective holding chamber for removably connecting the magnet chamber to the insulating chamber.

3. Gasket assembly, as set forth in claim 1, wherein the magnets are each of a rectangular configuration and continuously extend through substantially the entire length of the respective magnet chamber.

4. Gasket assembly, as set forth in claim 1, including a guiding chamber extending longitudinally along a first edge of each magnet chamber.

5. Gasket assembly, as set forth in claim 4, wherein adjacent walls of the guiding chambers are angularly disposed relative one to the other.

6. Gasket assembly, as set forth in claim 1, wherein each of the magnet chamber connecting means has first and second spaced connecting elements defining a chamber between the respective magnet chamber and insulating chamber.

\* \* \* \* \*